US009989830B2

(12) United States Patent
Horiguchi et al.

(10) Patent No.: US 9,989,830 B2
(45) Date of Patent: Jun. 5, 2018

(54) OPTICAL MODULATOR ELEMENT, OPTICAL MODULATION MODULE INCLUDING OPTICAL MODULATOR ELEMENT, AND METHOD FOR MANUFACTURING OPTICAL MODULATOR ELEMENT

(71) Applicant: Mitsubishi Electric Corporation, Chiyoda-ku (JP)

(72) Inventors: Yuichiro Horiguchi, Tokyo (JP); Satoshi Nishikawa, Tokyo (JP); Koichi Akiyama, Tokyo (JP); Shusaku Hayashi, Tokyo (JP); Yohei Hokama, Tokyo (JP); Kentaro Enoki, Tokyo (JP); Toshiyuki Tanaka, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days. days.

(21) Appl. No.: 15/425,258

(22) Filed: Feb. 6, 2017

(65) Prior Publication Data

US 2017/0242316 A1    Aug. 24, 2017

(30) Foreign Application Priority Data

Feb. 24, 2016  (JP) ................................ 2016-032619
Dec. 15, 2016  (JP) ................................ 2016-242894

(51) Int. Cl.
*G02F 1/225* (2006.01)
*G02B 6/30* (2006.01)
(Continued)

(52) U.S. Cl.
CPC ............. *G02F 1/2257* (2013.01); *G02B 6/30* (2013.01); *G02B 6/32* (2013.01); *G02F 1/2255* (2013.01);
(Continued)

(58) Field of Classification Search
CPC ........ G02F 1/2257; G02F 1/2255; G02B 6/30; G02B 6/32; H04B 10/5161
See application file for complete search history.

(56) References Cited

U.S. PATENT DOCUMENTS

| 8,135,242 B2 | 3/2012 | Sugiyama |
| 8,374,467 B2 * | 2/2013 | Sugiyama .......... G02B 6/12007 385/14 |

(Continued)

FOREIGN PATENT DOCUMENTS

| JP | 2010-185979 | 8/2010 |
| JP | 2014-92713 | 5/2014 |
| JP | 2014-164243 | 9/2014 |

*Primary Examiner* — Ryan Lepisto
(74) *Attorney, Agent, or Firm* — Oblon, McClelland, Maier & Neustadt, L.L.P.

(57) ABSTRACT

An optical modulator element includes first and second optical modulators, an optical input terminal, and a branch coupler. Each of the first and second optical modulators includes a pair of Mach-Zehnder waveguides, a first optical coupler to split rays from the branch coupler into the pair of Mach-Zehnder waveguides, and a second optical coupler to combine rays transmitted through the pair of Mach-Zehnder waveguides. The first and second optical modulators are disposed in such a manner that a traveling direction of rays propagating through the pair of Mach-Zehnder waveguides of the first optical modulator and a traveling direction of rays propagating through the pair of Mach-Zehnder waveguides of the second optical modulator are angled toward each other.

8 Claims, 11 Drawing Sheets

(51) Int. Cl.
*G02B 6/32* (2006.01)
*H04B 10/516* (2013.01)
*G02F 1/21* (2006.01)

(52) U.S. Cl.
CPC ... *H04B 10/5161* (2013.01); *G02F 2001/212* (2013.01); *G02F 2201/127* (2013.01); *G02F 2203/07* (2013.01)

(56) References Cited

U.S. PATENT DOCUMENTS

| | | |
|---|---|---|
| 9,046,703 B2 | 6/2015 | Fukuda et al. |
| 2013/0170782 A1* | 7/2013 | Evans .................. G02F 1/225 385/3 |

* cited by examiner

F I G. 10
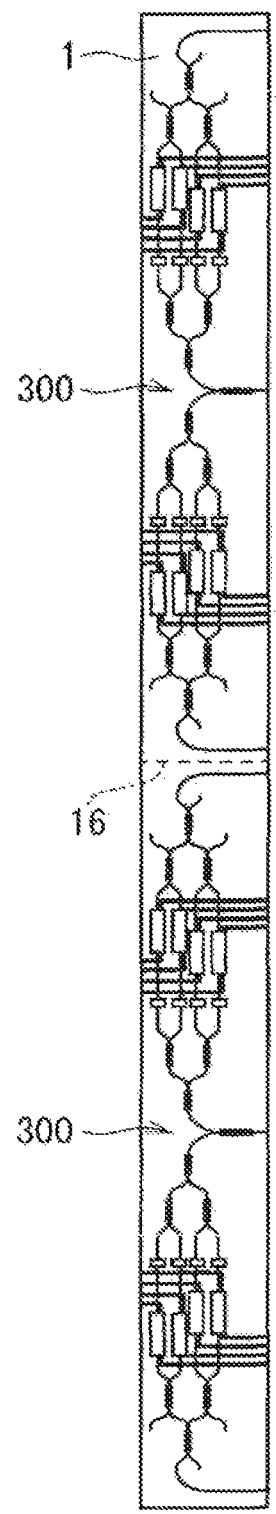

OPTICAL MODULATOR ELEMENT, OPTICAL MODULATION MODULE INCLUDING OPTICAL MODULATOR ELEMENT, AND METHOD FOR MANUFACTURING OPTICAL MODULATOR ELEMENT

BACKGROUND OF THE INVENTION

Field of the Invention

The present invention relates to an optical modulator element an optical modulation module including the optical modulator element, and a method for manufacturing optical modulator element.

Description of the Background Art

The recent data communications with high volumes of data traffic require optical fiber communication systems having increased capacity. Modulation schemes used in such systems include phase modulation and polarization-division multiplexing, in which multi-level signals are used to increase the channel capacity at a given band rate. Under these methods, Mach-Zehnder optical modulators are used to modulate signal light.

A light beam received by such a Mach-Zehnder optical modulator is split into two paths by an optical coupler, and then, is output when recombined by another optical coupler. The incident light beam is modulated with a phase shift that occurs due to refractive index variations caused by an electric filed applied to a medium in at least one of these paths.

Under the schemes such as the multilevel phase-shift keying using four or more phases, two Mach-Zehnder optical modulators are used to perform modulation. The incident light beam is split by an optical coupler, separately modulated with 90-degree phase shift by the respective modulators, and recombined by another optical coupler. Meanwhile, the polarization-division multiplexing requires different modulators for different directions of polarization (see, for example, Japanese Patent Application Laid-Open No. 2014-092713).

The conventional optical modulator elements in the polarization-division multiplexing scheme include modulators based on the electro-optic effect in crystalline materials such as lithium niobate ($LiNbO_3$). With advances in miniaturization and cost reduction in view, optical modulator elements have been developed which is formed on a semiconductor substrate made of indium phosphide (InP) or silicon (see, for example, Japanese Patent Application Laid-Open No. 2010-185979 and Japanese Patent Application Laid-Open No. 2014-164243).

However, the following drawbacks have been constraints for miniaturization of semiconductor optical modulator elements and optical modulation modules including the modulator elements.

Firstly, the conventional configuration including two optical modulator disposed in parallel with each other fails to minimize the gap between these modulators. This configuration is subject to spatial constraints associated with the outer diameter of a collimator lens disposed on the output side of the individual optical modulator. With the gap being required by two collimator lenses adjoining each other, this configuration fails to increase the proximity of two modulators any further.

Secondly, the above-mentioned configuration requires that high-frequency wave signals propagate through each optical modulator with the same amount of delay. Thus, high-frequency wave transmission lines are routed in such a manner that the length of each transmission line becomes equal to that of the longest one of the transmission lines. Thus, a larger area is required for the high-frequency wave transmission lines.

Thirdly, the path of the incident light beam interferes with the paths provided by the high-frequency wave transmission lines in the module. Alternatively, the high-frequency wave transmission lines may bypass the optical paths and optical components. However, this configuration requires a larger area for the high-frequency wave transmission lines, failing to reduce the module size.

SUMMARY OF THE INVENTION

The present invention has an object to provide an optical modulator element with a smaller chip area, an optical modulation module including the optical modulator element, and a method for manufacturing optical modulator element.

The optical modulator element according to the present invention includes a first optical modulator and a second optical modulator that are disposed on a semiconductor substrate, an optical input terminal, and a branch coupler. The optical input terminal receives a light beam. The branch coupler splits the light beam received by the optical input terminal into the first and second optical modulators. Each of the first and second optical modulators includes a pair of Mach-Zehnder waveguides, a first optical coupler, and a second optical coupler. The first optical coupler splits rays from the branch coupler into the pair of Mach-Zehnder waveguides. The second optical coupler combines rays transmitted through the pair of Mach-Zehnder waveguides. The first and second optical modulators are disposed in such a manner that a traveling direction of rays propagating through the pair of Mach-Zehnder waveguides of the first optical modulator and a traveling direction of rays propagating through the pair of Mach-Zehnder waveguides of the second optical modulator are angled toward each other.

The optical modulator element according to the present invention has a shorter length while the gap between the optical output terminal of the first optical modulator and the optical output terminal of the second optical modulator is kept wide enough for collimator lenses to fit in. The chip size of the optical modulator element is reduced accordingly.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a plan view of the semiconductor substrate cut out along the cutting line of FIG. 9;

DESCRIPTION OF THE PREFERRED EMBODIMENTS

Prerequisite Technique

Figure 11:
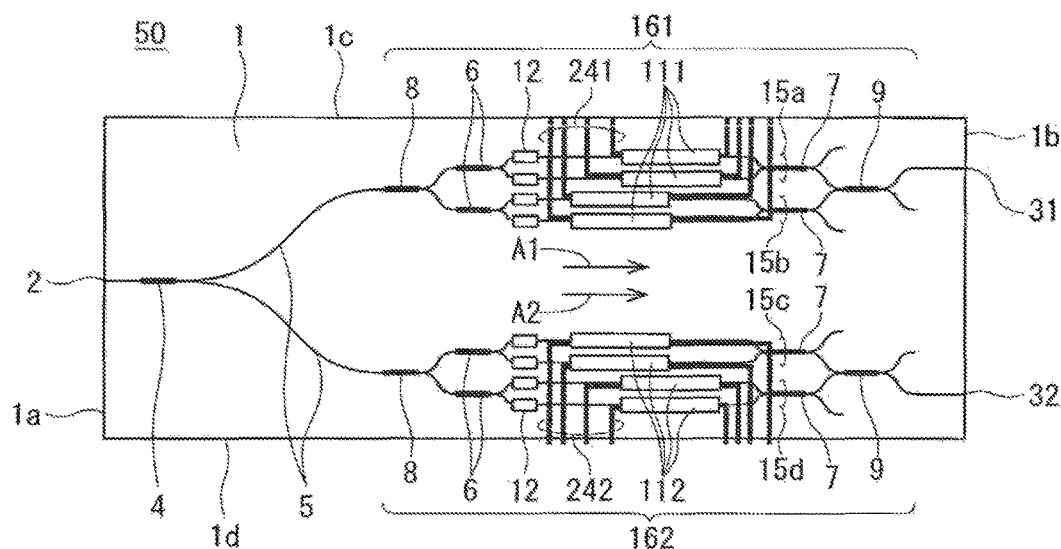
FIG. 11 is a plan view of the optical modulator element according to an prerequisite technique.
Figure 12:
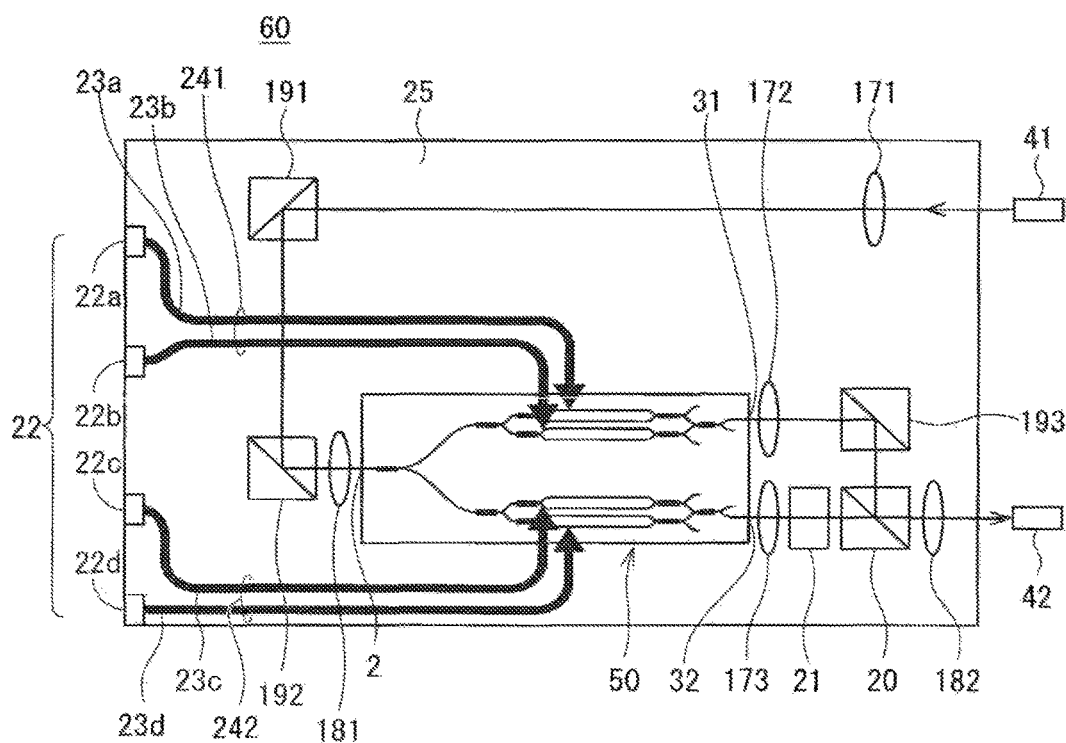
FIG. 12 is a plan view of the optical modulation module according to the prerequisite technique.

Before getting into embodiments of the present invention, the following will describe a prerequisite technique associated with the present invention. FIG. 11 is a plan view of an optical modulator element 50 according to the prerequisite technique. FIG. 12 is a plan view of an optical modulation module 60 including the optical modulator element 50 according to the prerequisite technique.

Here, the optical modulator element 50 according to the prerequisite technique performs optical modulation in dual-polarization quadrature phase-shift keying (also referred to as "DP-QPSK"). As illustrated in FIG. 11, the optical modulator element 50 includes a first optical modulator 161, a second optical modulator 162, an optical input terminal 2, and a branch coupler 4.

The first optical modulator 161 and the second optical modulator 162 are formed on a semiconductor substrate 1, which is an InP substrate or the like. A light beam received by the optical input terminal 2 is split by the branch coupler 4 and input to the first optical modulator 161 and the second optical modulator 162 through curved waveguides 5. Rays emitted by the first optical modulator 161 are output through an optical output terminal 31. Rays emitted by the second optical modulator 161 are output through an optical output terminal 32.

The first optical modulator 161 includes a pair of Mach-Zehnder waveguides 15a and 15b, a first optical coupler 8, and a second optical coupler 9. The first optical coupler 8 splits rays into the pair of Mach-Zehnder waveguides 15a and 15b. The second optical coupler 9 combines rays transmitted through the pair of Mach-Zehnder waveguides 15a and 15b.

The Mach-Zehnder waveguide 15a includes two sub-waveguides, an optical coupler 6 that splits received rays into the two sub-waveguides, and an optical coupler 7 that combines rays output through the two sub-waveguides. The Mach-Zehnder waveguide 15b has a configuration similar to the above.

As illustrated in FIG. 11, first high-frequency wave electrodes 111 are disposed along the individual sub-waveguides of the pair of Mach-Zehnder waveguides 15a and 15b of the first optical modulator 161. The first high-frequency wave electrodes 111 are electrically connected with a first high-frequency wave transmission path 241.

The second optical modulator 162 includes a pair of Mach-Zehnder waveguides 15c and 15d, the first optical coupler and the second optical coupler 9. The first optical coupler 8 splits rays into the pair of Mach-Zehnder waveguides 15c and 15d, the second optical coupler 9 combines rays transmitted through the pair of Mach-Zehnder waveguides 15c and 15d.

The Mach-Zehnder waveguide 15c includes two sub-waveguides, the optical coupler 6 that splits rays into the two sub-waveguides, the optical coupler 7 that recombines rays output through the two sub-waveguides. The Mach-Zehnder waveguide 15d has a configuration similar to the above.

As illustrated in FIG. 11, second high-frequency wave electrodes 112 are disposed along the individual sub-waveguides of the pair if Mach-Zehnder waveguides 15c and 15d of the second optical modulator 162. The second high-frequency wave electrodes 112 are electrically connected with a second high-frequency wave transmission path 242.

As illustrated in FIG. 11, phase adjusters 12 corresponding one-to-one to the sub-waveguides are provided. The phase adjusters 12 yield a phase shift of, for example, $\pi$ or $\pi/2$.

Each of the first and second high-frequency wave electrodes 111 and 112, the first and second high-frequency wave transmission paths 241 and 242, and the phase adjusters 12 is disposed aver the corresponding one of the first and second optical modulators 161 and 162, with an insulation layer therebetween.

The arrow A1 of FIG. 11 indicates the traveling direction of rays propagating through the pair of Mach-Zehnder waveguides 15a and 15b of the first optical modulator 161. The arrow A2 of FIG. 11 indicates the traveling direction of rays propagating through the pair of Mach-Zehnder waveguides 15c and 15d of the second optical modulator 162. According to the prerequisite technique, the direction indicated by the arrow A1 is parallel to the direction indicated by the arrow A2.

The optical modulator element 50 has sides 1a, 1b, 1c, and 1d that define its outline. The optical input terminal 2 is disposed on the side 1a of the optical modulator element 50. The optical output terminals 31 and 32 are disposed on the side 1b. The first high-frequency wave transmission path 241 extends from the side 1c so as to be connected to the first optical modulator 161. The second high-frequency wave transmission path 242 extends from the side 1d so as to be connected to the second optical modulator 162.

The first optical modulator 161 and the second optical modulator 162 of the optical modulator element 50 according to the prerequisite technique that are connected in parallel with each other are formed along the crystal orientation of the semiconductor substrate 1. Along the crystal orientation of the semiconductor substrate 1, material deposited on the semiconductor substrate 1 can be epitaxially grown smoothly and the semiconductor substrate 1 can be cut smoothly.

The following will describe a configuration of the optical modulation module 60 according to the prerequisite technique with reference to FIG. 12. As illustrated in FIG. 12, the optical modulator element 50 is disposed on a substrate 25 of the optical modulation module 60.

The optical modulation module 60 includes optical members, specifically, first to third collimator lenses 171 to 173, first and second condenser lenses 181 and 182, mirrors 191 to 193, a polarization beam splitter 20 (hereinafter also referred to as a "PBS 20"), and a rotator 21.

A light beam that has entered the optical modulation module 60 through an input fiber 41 is formed into parallel rays by the first collimator lens 171, and the rays propagate through the space. The rays change in direction when being reflected by the mirrors 191 and 192. Then, the first condenser lens 181 converges the rays to the optical input terminal 2 of the optical modulator element 50.

The rays output from the optical output terminal 31 of the optical modulator element 50 are framed into parallel rays by the second collimator lens 173, and the rays propagate through the space. The rays are reflected by the mirror 193, and then, enter the PBS 20.

The rays output from the optical output terminal 32 of the optical modulator element 50 are formed into parallel rays by the third collimator lens 173, and the rays propagate through the space. The polarization direction of the rays is rotated 90° by the rotator 21, and there the rays enter the PBS 20. The output rays combined by the PBS 20 pass through the second condenser lens 182 to be converged to an output fiber 42.

The optical modulation module 60 includes the first high-frequency wave transmission path 241 for transmuting a high-frequency wave signal to the first optical modulator 161. The first high-frequency wave transmission path 241 is a group of lines having a GSGSG pattern (G denotes a ground line and S demotes a signal line) or a GSSGSSG pattern. The first high-frequency wave transmission path 241 extends from the side 1c of the optical modulator element 50 so as to be connected to the first optical modulator 161. The second high-frequency wave transmission path 242 extends from the side 1d of the optical modulator element 50 so as to be connected to the second optical modulator 162. Although not shown in the drawings, a termination resistor is connected to one end of each of the first and second high-frequency wave transmission paths 241 and 242, whereas a high-frequency wave input unit 22 is connected to the other end of each of the first and second high-frequency wave transmission paths 241 and 242.

The optical modulation module 60 also includes the second high-frequency wave transmission path 242 for transmitting a high-frequency wave signal to the second optical modulator 162. The second high-frequency wave transmission path 242 is a group of lines having a having a GSGSG pattern or a GSSGSSG pattern.

The optical modulation module 60 includes the high-frequency wave input unit 22, namely, signal input terminals 22a, 22b, 22c, and 22d. The signal input terminals 22a and 22b are connected with high-frequency wave transmission lines 23a and 23b, respectively. The high-frequency wave transmission lines 23a and 23b constitute a group of transmission lines, which corresponds to the first high-frequency wave transmission path 241. The signal input terminals 22c and 22d are connected with high-frequency wave transmission lines 23c and 23d, respectively. The high-frequency transmission lines 23c and 23d constitute a group of transmission lines, which corresponds to the second high-frequency wave transmission path 242.

There has been a demand to reduce the outline, namely, the chip size of the optical modulator element 50 according to the prerequisite technique. As for the optical modulation module 60 according to the prerequisite technique, there has been a demand to shorten the high-frequency transmission lines extending from the signal input terminals to the optical modulators. In the optical modulation module 60 according to the prerequisite technique, the high-frequency wave transmission lines and the optical members have been arranged in a manner to minimize the interference between the high-frequency transmission lines and the paths of propagating rays. This configuration has unfortunately increased the size of the optical modulation module 60. Embodiments of the present invention aim to solve these problems.

First Preferred Embodiment

Figure 1:
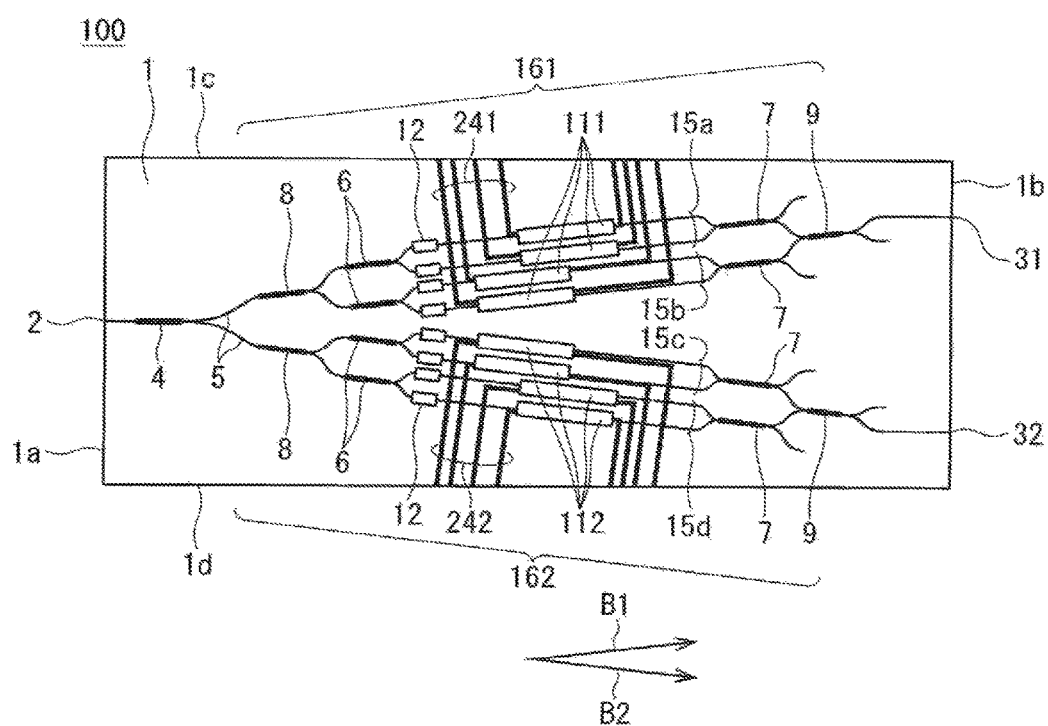
FIG. 1 is a plan view of an optical modulator element according to a first preferred embodiment.

FIG. 1 is a plan view of an optical modulator element 100 according to a first preferred embodiment. The optical modulator element 100 in the first preferred embodiment performs optical modulation in, for example, dual-polarization quadrature phase-shift keying (also referred to as "DP-QPSK"). As illustrated in FIG. 1, the optical modulator element 100 includes the first and second optical modulators 161 and 162, the optical input terminal 2, and the branch coupler 4.

The first and second optical modulators 161 and 162 of the optical modulator element 100 according to the first preferred embodiment are arranged differently from the first and second optical modulators 161 and 162 of the optical modulator element 50 according to the prerequisite technique. As illustrated in FIG. 1, the arrow B1 of FIG. 1 indicates the traveling direction of rays propagating through the pair of Mach-Zehnder waveguides 15a and 15b of the first optical modulator 161. The arrow B2 of FIG. 1 indicates the traveling direction of rays propagating through the pair of Mach-Zehnder waveguides 15c and 15d of the second optical modulator 162. In the first preferred embodiment, the directions indicated by the arrows B1 and B2 are angled toward each other.

In the first preferred embodiment, the bend radius of each of the curved waveguides 5 disposed between the branch coupler and the first and second optical modulators 161 and 162 is equal to the smallest possible bend radius for acceptable waveguide loss.

As illustrated in FIG. 1, the first and second optical modulators 161 and 162 are disposed so as to be mirror images of each other relative to the optical input terminal 2. The gap between the optical output terminal 31 of the first optical modulator 161 and the optical output terminal 32 of the second optical modulator 162 should be wide enough for the second and third collimator lenses 172 and 173 (see FIG. 12) to fit in.

In the optical modulator element 50 according to the prerequisite technique, the first and second optical modulators 161 and 162 have been disposed in parallel with each other. In the optical modulator element 100 according to the first preferred embodiment, meanwhile, the first and second optical modulators 161 and 162 are disposed in such a manner that the distance between the respective first optical couplers 8 is shorter than the distance between the respective second optical couplers 9.

The optical modulator element 100 has the sides 1a, 1b, 1c, and 1d that define its outline. The optical input terminal 2 is disposed on the side 1a of the optical modulator element 100. The optical output terminals 31 and 32 are disposed on the side 1b. The first high-frequency wave transmission path 241 extends from the side 1c so as to be connected to the first optical modulator 161. The second high-frequency wave transmission path 242 extends from the side 1d so as to be connected to the second optical modulator 162.

The optical modulator element 100 according to the first preferred embodiment is otherwise similar to the optical modulator element according to the prerequisite technique (FIG. 11) and will not be further elaborated here.

The following description will be given assuming that the optical modulator element 100 according to the first preferred embodiment performs optical modulation in the dual-polarization quadrature phase-shift keying. However, optical modulation is not limited to particular schemes.

The optical modulation module including the optical modulator element 100 according to the first preferred embodiment may be obtained by, for example, substituting the optical modulator element 100 for the optical modulator element 50 included in the optical modulation module 60 according to the prerequisite technique (FIG. 12).

Effects

The optical modulator element 100 according to the first preferred embodiment includes the first and second optical modulators 161 and 162 disposed on the semiconductor substrate 1, the optical input terminal 2 to receive a light beam, and the branch coupler 4 to split the light beam received by the optical input terminal 2 into the first and second optical modulators 161 and 162. Each of the first and second optical modulators 161 and 162 includes a pair of Mach-Zehnder waveguides, the first optical coupler 8 to split rays from the branch coupler 4 into a pair of Mach-Zehnder waveguides, and the second optical coupler 9 to combine the rays transmitted through the pair of Mach-Zehnder waveguides. The first and second optical modulators 161 and 162 are disposed in such a manner that the traveling direction of the rays propagating through the pair of Mach-Zehnder waveguides 15a and 15b of the first optical modulator 161 and the traveling direction of the rays propagating through the pair of Mach-Zehnder waveguides 15c and 15d of the second optical modulator 162 are angled toward each other.

In the first preferred embodiment, the traveling direction of the rays propagating through the pair of Mach Zehnder waveguides of the first optical modulator 161 and the traveling direction of the rays propagating through the pair of Mach-Zehnder waveguides of the second optical modulator 162 are angled toward each other, so that the curved waveguides 5 that connect the branch coupler 4 to the first and second optical modulators 161 and 162 are gently curved. This configuration can shorten the curved waveguides 5. Thus, this configuration can shorten the side 1c (the side 1d) of the optical modulator element 100 while the gap between the optical output terminals 31 and 32 is kept wide enough for the collimator lenses 172 and the 173 to fit in. The chip size of the optical modulator element 100 is reduced accordingly.

Second Preferred Embodiment

Figure 2:
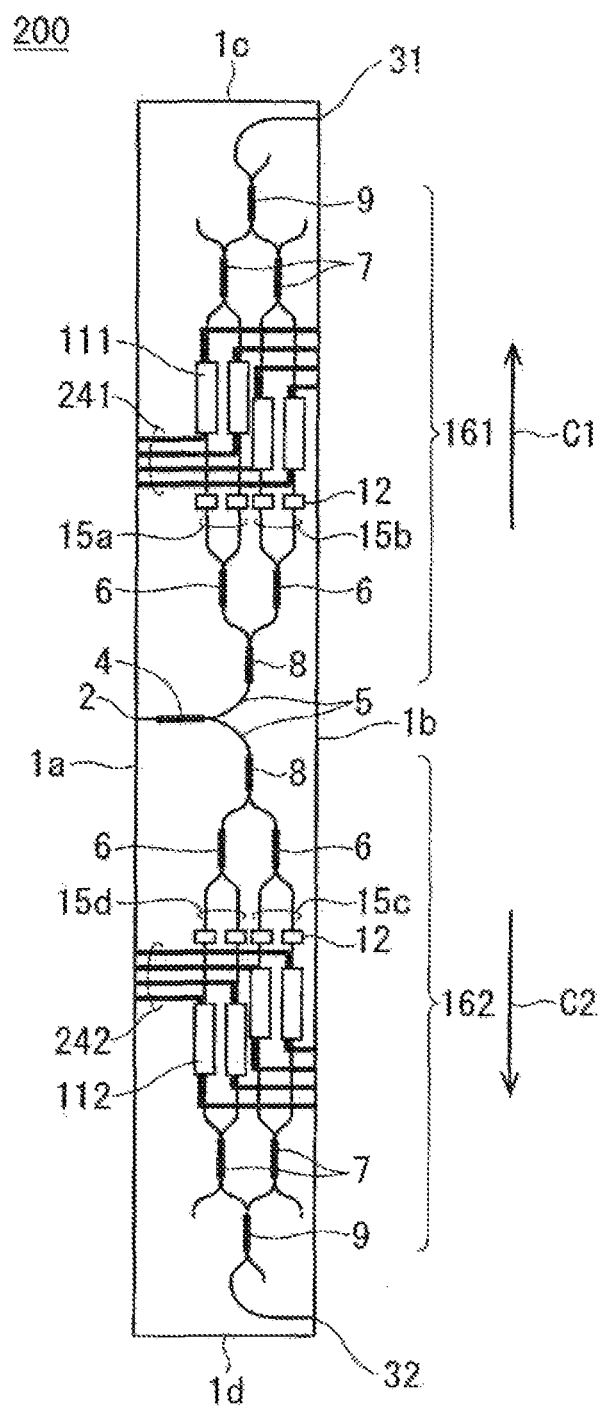
FIG. 2 is a plan view of the optical modulator element according to a second preferred embodiment.

FIG. 2 is a plan view of an optical modulator element 200 according to a second preferred embodiment. In the second preferred embodiment, the traveling direction of rays propagating through the pair of Mach-Zehnder waveguides 15a and 15b of the first optical modulator 161 (the direction indicated by the arrow C1 of FIG. 2) forms an angle of 180° with the traveling direction of rays propagating through the pair of Mach-Zehnder waveguides 15c and 15d of the second optical modulator 162 (the direction indicated by the arrow C2 of FIG. 2).

As illustrated in FIG. 2, the optical input terminal 2 is located on the midpoint of the side 1a. The branch coupler 4, which is connected to the optical input terminal 2, is connected to the first and second optical modulators 161 and 162 through the curved waveguides 5. The curved waveguides 5 change the propagation direction of rays 90°. The bend radius of the individual curved waveguide 5 is equal to the smallest possible bend radius for acceptable waveguide loss.

The traveling direction of rays propagating through the first optical modulator 161 is changed 90° by the curved waveguide, and then, the rays are output from the optical output terminal 31 disposed on the side 1b. The bend radius of the curbed waveguide is equal to the smallest possible bend radius for acceptable waveguide loss.

Similarly, the traveling direction of rays propagating through the second optical modulator 162 is changed 90° by the curved waveguide, and then, the rays are output from the optical output terminal 32 disposed on the side 1b. The bend radius of the curbed waveguide is equal to the smallest possible bend radius for acceptable waveguide loss.

As illustrated in FIG. 2, the first high-frequency wave electrodes 111 are disposed along the individual sub-waveguides of the pair of Mach-Zehnder waveguides 15a and 15b of the first optical modulator 161. The first high-frequency wave electrodes 111 are electrically connected with the first high-frequency wave transmission path 241.

Similarly, as illustrated in FIG. 2, the second high-frequency wave electrodes 112 are disposed along the individual sub-waveguides of the pair of Mach-Zehnder waveguides 15c and 15d of the second optical modulator 162. The second high-frequency wave electrodes 112 are electrically connected with the second high-frequency wave transmission path 242.

As illustrated in FIG. 2, the phase adjusters 12 corresponding one-to-one to the sub-waveguides are provided. The phase adjusters 12 yield a phase shift of, for example, π.

Each of the first and second high-frequency wave electrodes 111 and 112, the first and second high-frequency wave transmission paths 241 and 242, and the phase adjusters 12 is disposed over the corresponding one of the first and second optical modulators 161 and 162, with an insulation layer therebetween.

In the second preferred embodiment, the first and second optical modulators 161 and 162 are disposed so as to be mirror images of each other relative to the optical input terminal 2. The first and second high-frequency wave electrodes 111 and 112 are disposed so as to be mirror images of each other relative to the optical input terminal 1. The first and second high-frequency wave transmission paths 241 and 242 are disposed so as to be mirror images of each other relative to the optical input terminal 2.

The chip width along the side 1a (or the side 1b) of the optical modulator element 200 is set to be equal to or greater than the sum of double the minimum bend radius of the individual curved waveguide 5, the bend radii of the optical output terminals 31 and 32, the length of the first optical modulator 161, and the length of the second optical modulator 162. The chip length along the side 1c (or the side 1d) is set to be equal to or greater than the sum of half the width of the first or second optical modulator 161 or 162, the minimum bend radius of the individual curved waveguide 5, the length of the branch coupler 4, and the length of the waveguide of the optical input terminal 2.

The chip width along the side 1a (or the side 1b) of the optical modulator element 200 is equal to or less than double the chip length corresponding to the side 1c (or the side 1d) of the optical modulator element 50 according to the prerequisite technique (FIG. 11). The chip length along the side 1c (or the side 1d) of the optical modulator element 200 is equal to or less than half the chip width corresponding to the side 1a (or the side 1b) of the optical modulator element 50 according to the prerequisite technique (FIG. 11). Thus, the chip area of the optical modulator element 200 is smaller than the chip area of the optical modulator element according to the prerequisite technique.

The distance between the optical output terminal 31 and the optical output terminal 32 disposed on the side 1b of the optical modulator element 200 is roughly equal to the sum of the lengths of the first and second optical modulators 161 and 162. This configuration allows sufficient space for the second collimator lens 172 and the third collimator lens 173. Unlike the prerequisite technique (FIG. 11), this preferred embodiment, in which the first and second optical modulators 161 and 162 are disposed so as to be apart from each other, can minimize the high-frequency wave signal crosstalk.

The first and second high-frequency wave transmission paths 241 and 242 of the optical modulator element 200 extend across the side 1a. Thus, all of the wires connected to the high frequency transmission lines extend from one side of the optical modulator element 200.

The optical modulator element 200 may include, as part of the waveguides constituting the optical output terminals 31 and 32, semiconductor optical amplifiers including multiple quantum wells (MQW). In the second preferred embodiment, the optical output terminal 31 and the optical output terminal 32 are disposed so as to be apart from each other, and thus, the gain of the semiconductor optical amplifiers is less likely to be reduced due to thermal crosstalk.

Effects

In the optical modulator element 200 according to the second preferred embodiment, the traveling direction of rays propagating through the pair of Mach-Zehnder waveguides of the first optical modulator 161 forms an angle of 180° with the traveling direction of rays propagating through the pair of Mach-Zehnder waveguides of the second optical modulator 162.

The chip area of the optical modulator element 200, in which the traveling direction of rays propagating through the pair of Mach-Zehnder waveguides of the first optical modulator 161 forms an angle of 180° with the traveling direction of rays propagating through the pair of Mach-Zehnder waveguides of the second optical modulator 162, is smaller than the chip area of the optical modulator element according to the prerequisite technique (FIG. 11), in which the first and second optical modulators 161 and 162 are adjacently disposed in parallel with each other. In addition, the second preferred embodiment, in which the first and second optical modulators 161 and 162 are disposed so as to be apart from each other, can minimize the high-frequency wave signal crosstalk.

The optical modulator element 200 according to the second preferred embodiment further includes the first high-frequency wave electrodes 111 disposed along the pair of Mach-Zehnder waveguides 15a and 15b of the first optical modulator 161, the second high-frequency wave electrodes 112 disposed along the pair of Mach-Zehnder waveguides 15c and 15d of the second optical modulator 162, the first high-frequency wave transmission path 241 connected to the first high-frequency wave electrodes 111, and the second high-frequency wave transmission path 242 connected to the second high-frequency wave electrodes 112. The first and second optical modulators 161 and 162 are disposed so as to be mirror images of each other relative to the optical input terminal 2. The first and second high-frequency wave electrodes 111 and 112 are disposed so as to be mirror images of each other relative to the optical input terminal 2. The first and second high-frequency wave transmission paths 241 and 242 are disposed so to be mirror images of each other relative to the optical input terminal 2.

The optical modulator element 200 includes the first and second optical modulators 161 and 162 that are disposed so as to be mirror images of each other relative to the optical input terminal 2, the first and second high-frequency wave electrodes 111 and 112 that are disposed so as to be mirror images of each other relative to the optical input terminal 2, and the first and second high-frequency wave transmission paths 241 and 242 that are disposed so as to be mirror images of each other relative to the optical input terminal 2. Thus, electrical members and optical members of the optical modulate element 200 are symmetrically arranged. This configuration avoids complication of the arrangement of the high-frequency wave transmission lines connected to the optical modulator element 200 end the arrangement of the paths of light beams input to and output from the optical modulator element 200.

Third Preferred Embodiment

Figure 3:
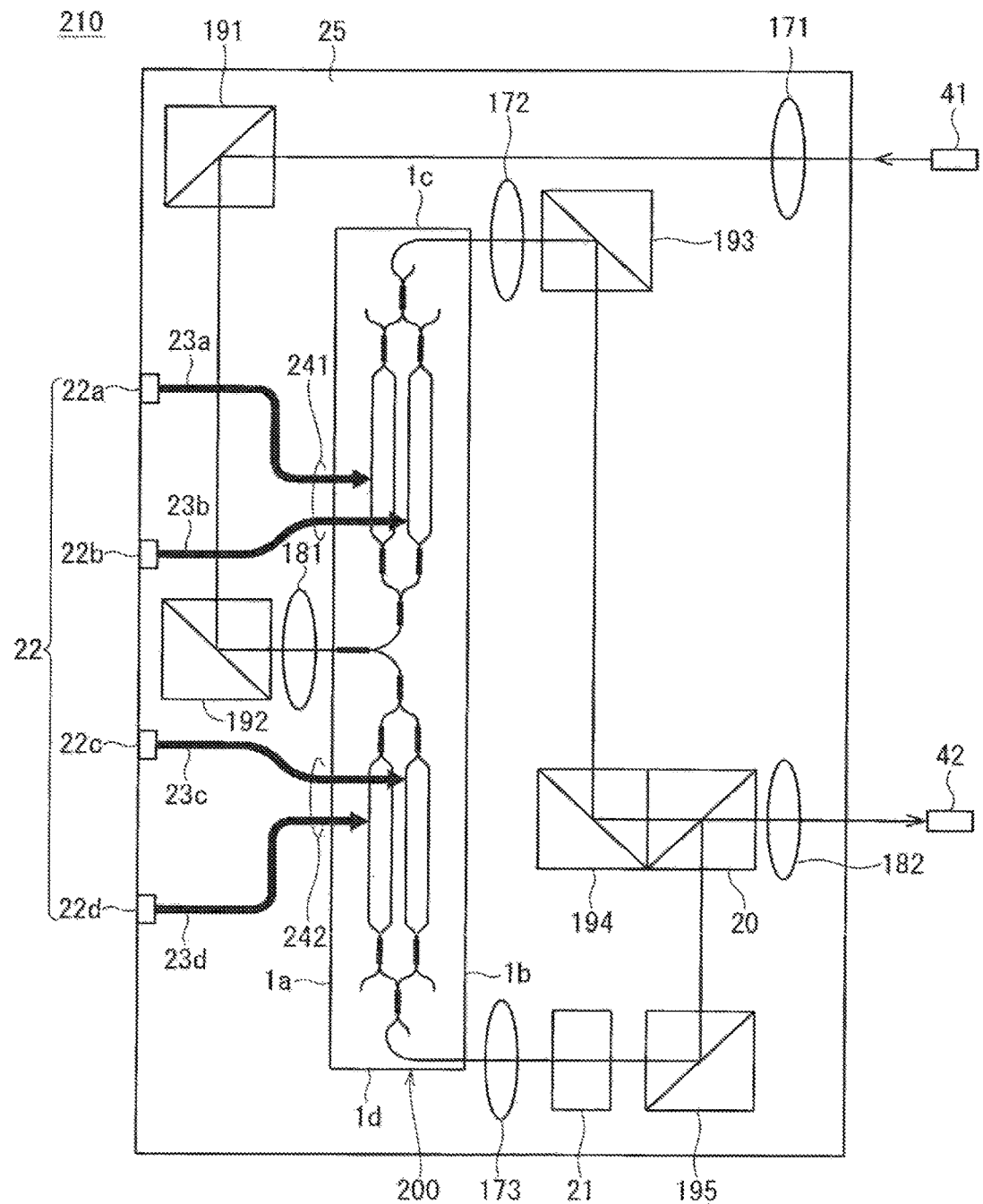
FIG. 3 is a plan view of an optical module according to a third preferred embodiment.

FIG. 3 is a plan view of an optical modulation module 210 according to a third preferred embodiment. As illustrated in FIG. 3, the optical modulator element 200 described in the second preferred embodiment (FIG. 2) is disposed on the substrate 25 of the optical modulation modulo 210.

The optical modulation module 210 includes optical members, specifically, the first to third collimator lenses 171 to 173, the first and second condenser lenses 181 and 182, the mirrors 191 to 193, a mirror 194, a mirror 195, the PBS 20, and the rotator 21.

A light beam that has entered the optical modulation module 210 through the input fiber 41 is formed into parallel rays by the first collimator lens 171, and the rays propagate through the space. The rays change in direction when being reflected by the mirrors 191 and 192. Then, the first condenser lens 181 converges the rays to the optical input terminal 2 of the optical modulator element 200.

The rays output from the optical output terminal 31 of the optical modulator element 200 are formed into parallel rays by the second collimator lens 172, and the rays propagate through the space. The rays are reflected by the mirrors 193 and 194, and then, enter the PBS 20.

The rays output from the optical output terminal 32 of the optical modulator element 200 are formed into parallel rays by the third collimator lens 173, and the rays propagate through the space. The polarization direction of the rays is rotated 90° by the rotator 21. The rays are reflected by the mirror 195, and then, enter the PBS 20. The output rays combined by the PBS 20 pass through the second condenser lens 182 to be converged to the output fiber 42.

The optical modulation module 210 includes the first high-frequency wave transmission path 241 for transmitting a high-frequency wave signal to the first optical modulator 161. The first high-frequency wave transmission path 241 is a group of lines having a GSGSG pattern or a GSSGSSG pattern.

The optical modulation module 210 also includes the second high-frequency wave transmission path 242 for transmitting a high-frequency wave signal to the second optical modulator 162. The second high-frequency wave transmission path 242 is a group of lines having a GSGSG pattern or a GSSGSSG pattern.

The optical modulation module 210 includes the high-frequency wave input unit 22, namely, the signal input terminals 22a, 22b, 22c, and 22d. The signal input terminals 22a and 22b correspond to the first high-frequency wave transmission path 241. The signal input terminals 22c and 22d correspond to the second high-frequency wave transmission path 242.

As illustrated in FIG. 2, the first and second high-frequency wave transmission paths 241 and 242 extend across the side 1a of the optical modulator element 200. The optical modulator element 200 is disposed in the optical modulation module 210 in such a manner that the side 1a of the optical modulator element 200 is opposed to the high-frequency wave input unit 22. This configuration can shorten the first and second high-frequency wave transmission paths 241 and 242.

The signal input terminals 22a, 22b, 22c, and 22d included in the high-frequency wave input unit 22 are disposed at regular intervals. The distance between the first and second high-frequency wave transmission paths 241 and 242 of the optical modulator element 200 is obtained by deducting half the width of the first or second optical modulator 161 or 162 from double the distance between the adjacent signal input terminals (such as the distance between the signal input terminals 22a and 22b).

Fourth Preferred Embodiment

Figure 4:
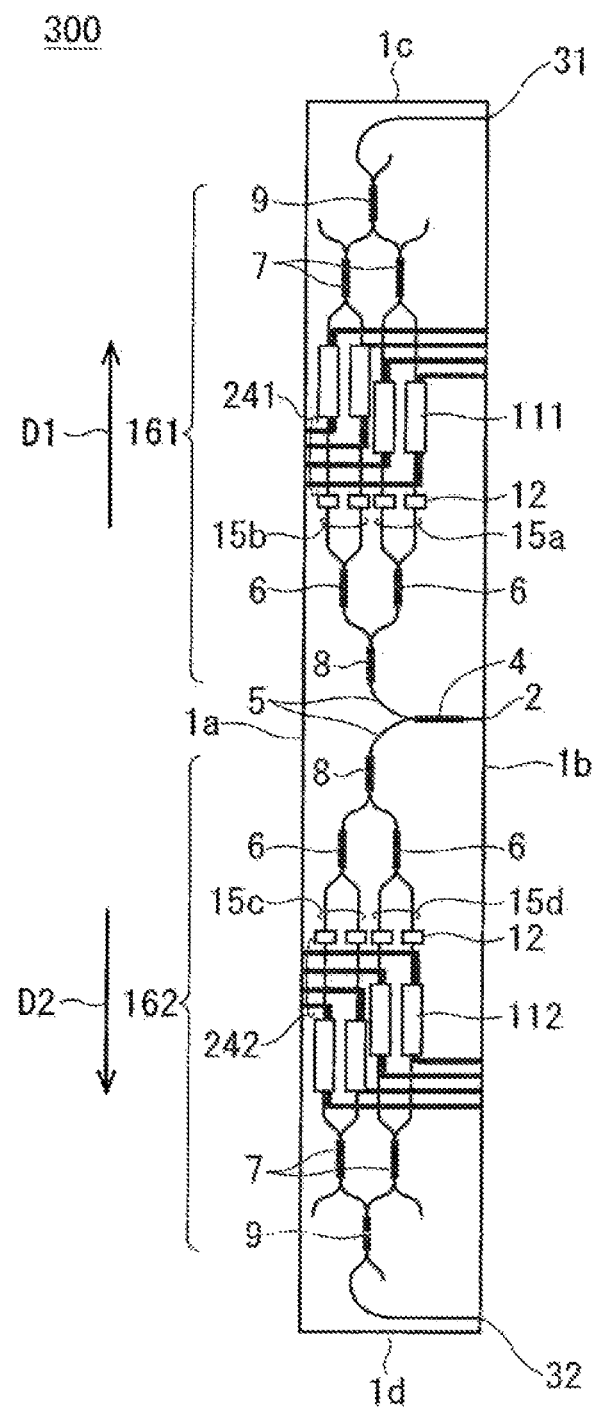
FIG. 4 a plan view the optical modulator element according to a fourth preferred embodiment.

FIG. 4 is a plan view of an optical modulator element 300 according to a fourth preferred embodiment. In the fourth preferred embodiment, the traveling direction of rays propagating through the pair of Mach-Zehnder waveguides 15a and 15b of the first optical modulator 161 (the direction indicated by the arrow D1 of FIG. 4) forms an angle of 180° with the direction of rays propagating through the pair of Mach-Zehnder waveguides 15c and 15d of the second optical modulator 162 (the direction indicated by the arrow D2 of FIG. 4).

The optical input terminal 2 of the optical modulator element 200 according to the second preferred embodiment has been disposed on the side 1a. Meanwhile, the optical input terminal 2 of the optical modulator element 300 according to the fourth preferred embodiment is disposed on the side 1b opposite to the side 1a. The optical modulator element 300 according to the fourth preferred embodiment is otherwise similar to the optical modulator element 200 according to the second preferred embodiment and will not be further elaborated here.

The optical input terminal 2, the optical output terminal 31, and the optical output terminal 32 of the optical modulator element 300 according to the fourth preferred embodiment are disposed on the same side (the side 1b). The first and second high-frequency wave transmission paths 241 and 242 of the optical modulator element 300 extend across the side 1a opposite to the side 1b.

As mentioned above, the optical input terminal 2, the optical output terminal 31, and the optical output terminal 2 are disposed on the same side, namely, the side 1b of the optical modulator element 300. Thus, all of the optical members of the optical modulation module, on which the optical modulator element 300 is to be mounted, can be disposed so as to be adjacent to the side 1b.

Similarly to the optical modulator element 200, the optical modulator element 300 may include, as part of the waveguides constituting the optical output terminals 31 and 32, semiconductor optical amplifiers including multiple quantum wells (MQW). In the fourth preferred embodiment, the optical output terminal 31 and the optical output terminal 32 are disposed so as to be apart from each other, and thus, the gain of the semiconductor optical amplifiers is less likely to be reduced due to thermal crosstalk.

Effects

In the optical modulator element 300 according to the fourth preferred embodiment, the traveling direction of rays propagating through the pair of Mach-Zehnder waveguides 15a and 15b of the first optical modulator 161 forms an angle of 180° with the traveling direction of rays propagating through the Mach-Zehnder waveguides 15c and 15d of the second optical modulator 162.

The chip area of the optical modulator element 200, in which the traveling direction of rays propagating through the pair of Mach-Zehnder waveguides of the first optical modulator 161 forms an angle of 180° with the traveling direction of rays propagating through the pair of Mach-Zehnder waveguides of the second optical modulator 162, is smaller than the chip area of the optical modulator element according to the prerequisite technique (FIG. 11), in which the first and second optical modulators 161 and 162 are adjacently disposed in parallel with each other. In addition, the fourth preferred embodiment, in which the first and second optical modulators 161 and 162 are disposed so as to be apart from each other, can minimize the high-frequency wave signal crosstalk.

The optical modulator element 300 according to the forth preferred embodiment further includes the first high-frequency wave electrodes 111 disposed along the pair of Mach-Zehnder waveguides 15a and 15b of the first optical modulator 161, the second high-frequency wave electrodes 112 disposed along the pair of Mach-Zehnder waveguides 15c and 15d of the second optical modulator 162, the first high-frequency wave transmission path 241 connected to the first high-frequency wave electrodes 111, and the second high-frequency wave transmission path 242 connected to the second high-frequency wave electrodes 112. The first and second optical modulators 161 and 162 are disposed so as to be mirror images of each other relative to the optical input terminal 2. The first and second high-frequency wave electrodes 111 and 112 are disposed so as to be mirror images of each other relative to the optical input terminal 2. The first and second high-frequency wave transmission paths 241 and 242 are disposed so as to be mirror images of each other relative to the optical input terminal 2.

The optical modulator element 300 includes the first and second optical modulators 161 and 162 that are disposed so as to be mirror images of each other relative to the optical input terminal 2, the first and second high-frequency wave electrodes 111 and 112 that are disposed so as to be mirror images of each other relative to the optical input terminal 2, and the first and second high-frequency wave transmission paths 241 and 242 that are disposed so as to be mirror images of each other relative to the optical Input terminal 2. Thus, electrical members and optical members of the optical modulator element 300 are symmetrically arranged. This configuration avoids complication of the arrangement of the high-frequency wave transmission lines connected to the optical modulator element 300 and the arrangement of the paths of light beams input to and output from the optical modulator element 300.

The optical modulator element 300 according to the fourth preferred embodiment has the sides (the sides 1a, 1b, 1c, and 1d) that define its outline in a plan view. The optical input terminal 2, the optical output terminal 31 of the first optical modulator 161, and the optical output terminal 32 of the second optical modulator 162 are disposed on the same side (the side 1b).

The optical input terminal 2, the optical output terminal 31, and the optical output terminal 32 of the optical modulator element 300 are disposed on the same side, namely, the side 1b. Thus, all of the optical members of the optical modulation module, on which the optical modulator element 300 is to be mounted, can be disposed so as to be adjacent to the side 1b. The optical input terminal 2, the optical output terminal 31, and the optical output terminal 32 are disposed on the same side, namely, the side 1b. Thus, it is only required that an antireflection coating be applied to the side 1*ba* alone. This preferred embodiment can reduce manufacturing costs accordingly.

Fifth Preferred Embodiment

Figure 5:
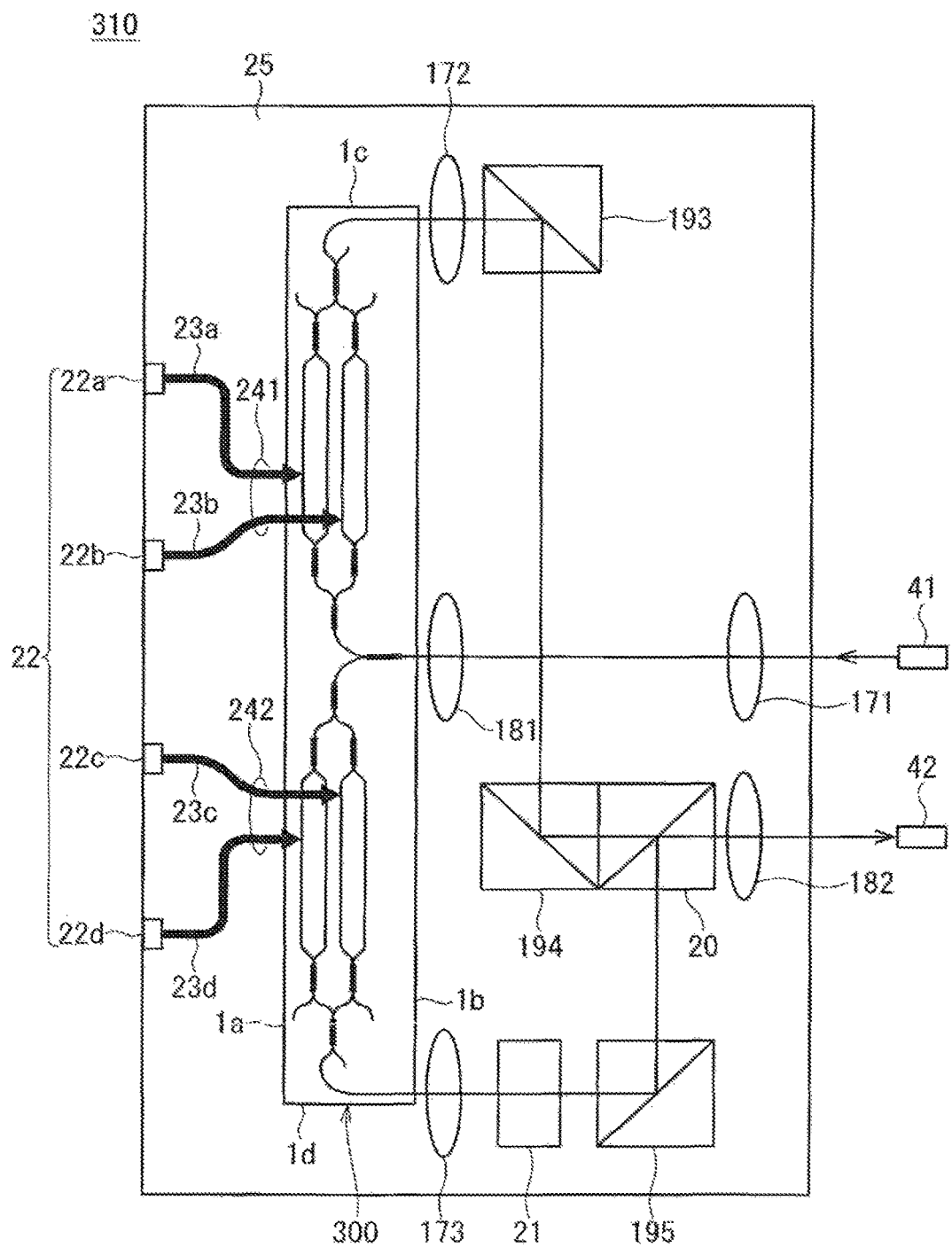
FIG. 5 is a plan view of the optical modulation module according to a fifth preferred embodiment.

FIG. 5 is a plan view of an optical modulation module 310 according to a fifth preferred embodiment. As illustrated in FIG. 5, the optical modulator element 300 described in the fourth preferred embodiment (FIG. 4) is disposed on the substrate 25 of the optical modulation on module 310.

The optical modulation module 310 includes optical members, specifically, the first to third collimator lenses 171 to 173, the first and second condenser lenses 181 and 182, the mirrors 193 to 195, the PBS 20, and the rotator 21.

A light beam that has entered the optical modulation module 310 through the input fiber 41 is formed into parallel rays by the first collimator lens 171, and the rays propagate through the space. The first condenser lens 181 converges the rays to the optical input terminal 2 of the optical modulator element 300.

The rays output from the optical output terminal 31 of the optical modulator element 300 are formed into parallel rays by the second collimator lens 172, and the rays propagate through the space. The rays are reflected by the mirrors 193 and 194, and then, enter the PBS 20.

The rays output from the optical output terminal 32 of the optical modulator element 300 are formed into parallel rays by the third collimator lens 173, and the rays propagate through the space. The polarization direction of the rays is rotated 90° by the rotator 21. The rays are reflected by the mirror 195, and then, enter the PBS 20. The output rays combined by the PBS 20 pass through the second condenser lens 182 to be converged to the output fiber 42.

In the fifth preferred embodiment, the first and second condenser lenses 181 and 182, the first to third collimator lenses 171 to 173, the rotator 21, and the PBS 20 are disposed so as to be adjacent to a second side (the side 1*b*) opposite to a first side (the side 1*a*) of the optical modulator element 300. The mirrors 193 to 195 are also disposed so as to be adjacent to the side 1*b*.

The input fiber 41 and the output fiber 42 are disposed on the side of the optical modulation module 310 according to the fifth preferred embodiment opposite to the side on which the high-frequency wave input unit 22 is disposed.

The optical modulation module 310 includes the first high-frequency wave transmission path 241 for transmitting a high-frequency wave signal to the first optical modulator 161. The first high-frequency wave transmission path 241 is a group of lines having a GSGSG pattern or a GSSGSSG pattern.

The optical modulation module 310 also includes the second high-frequency wave transmission path 242 for transmitting a high-frequency wave signals to the second optical modulator 162. The second high-frequency wave transmission path 242 is a group of lines having a GSGSG pattern or a GSSGSSG pattern.

The optical modulation module 310 includes the high-frequency wave input unit 22, namely, the signal input terminals 22*a*, 22*b*, 22*c*, and 22*d*. The signal input terminals 22*a* and 22*b* correspond to the first high-frequency wave transmission path 241. The signal input terminals 22*c* and 22*d* correspond to the second high-frequency wave transmission path 242.

As illustrated in FIG. 4, the first and second high-frequency wave transmission paths 241 and 242 extend across the side 1*a* of the optical modulator element 300. The optical modulator element 300 is disposed in the optical modulation module 310 in such a manner that the side 1*a* of the optical modulator element 300 is opposed to the high-frequency wave input unit 22. This configuration can shorten the first and second high-frequency wave transmission paths 241 and 242.

The signal input terminals 22*a*, 22*b*, 22*c*, and 22*d* included in the high-frequency wave input unit 22 are disposed at regular intervals. The distance between the first and second high-frequency wave transmission paths 241 and 242 of the optical modulator element 300 is obtained by deducting half the width of the first or second optical modulator 161 or 162 from double the distance between the adjacent signal input terminals (such as the distance between the signal input terminals 22*a* and 22*b*).

The high-frequency transmission lines extending from the signal input terminals 22*a* and 22*b* come close to each other as they approach the first optical modulator 161, thereby constituting the first high-frequency wave transmission path 241. The center position of the first high-frequency wave transmission path 241 is located close to the signal input terminal 22*b* so as to be at a distance corresponding to half the distance between the pair of Mach-Zehnder waveguides away from the midpoint of the signal input terminals 22*a* and 22*b*.

Similarly, the high-frequency transmission lines extending from the signal input terminals 22*c* and 22*d* come close to each other as they approach the second optical modulator 162, thereby constituting the second high-frequency wave transmission path 242. The center position of the second high-frequency wave transmission path 242 is located close to the signal input terminal 22*c* so as to be at a distance corresponding half the distance between the pair of Mach-Zehnder waveguides away from the midpoint of the signal input terminals 22*c* and 22*d*.

The high-frequency wave input unit 22 of the optical modulation module 310 according to the fifth preferred embodiment is opposed to the side 1*a* of the optical modulator element 300. This configuration can readily equalize the length of the first high-frequency wave transmission path 241 extending from the high-frequency wave input unit 22 to the first optical modulator 161 and the length of the second high-frequency wave transmission path 142 extending from the high-frequency wave input unit 22 to the second optical modulator 162. The first and second high-frequency wave transmission paths 241 and 242 of the optical modulation module 310 according to the fifth preferred embodiment can be shorter than the corresponding transmission paths of the optical modulation module according to the prerequisite technique (FIG. 12). This preferred embodiment can reduce the size of the optical modulation module 310 accordingly.

The first and second high-frequency wave transmission paths 241 and 242 do not interfere with the paths of propagating rays in the optical modulation module 310 according to the fifth preferred embodiment. This configuration eliminates the first and second high-frequency wave transmission paths 241 and 242 having to bypass the paths of propagating rays. The footprints of the first and second high-frequency wave transmission paths 241 and 242 are thus reduced, and the size of the optical modulation module 310 is also reduced accordingly.

The individual collimator lenses and the individual condenser lenses of the optical modulation module 310 according to the fifth preferred embodiment are not in close proximity to each other. This configuration facilitates assembly, with reduced manufacturing costs.

Effects

The optical modulation module 310 according to the fifth preferred embodiment further includes the optical modulator element 300, the signal input terminals 22a and 22b corresponding to the first high-frequency wave transmission path 241, and the signal input terminals 22c and 22d corresponding to the second high-frequency wave transmission path 242. The optical modulator element 300 has sides that define its outline in a plan view. The signal input terminals 22a and 22b corresponding to the first high-frequency wave transmission path 241 and the signal input terminals 22c and 22d corresponding to the second high-frequency wave transmission path 242 are disposed on the first side (the side 1a) of the optical modulator element 300. The signal input terminals 22a and 22b corresponding to the first high-frequency wave transmission path 241 and the signal input terminals 22c and 22d corresponding to the second high-frequency wave transmission path 242 are disposed at regular intervals.

The high-frequency wave input unit 22 (namely, the signal input terminals 22a, 22b, 22c, and 22d) of the optical modulation module 310 according to the fifth preferred embodiment are opposed to the side 1a of the optical modulator element 300. This configuration can readily equalize the length of the first high-frequency wave transmission path 241 extending from the high-frequency wave input unit 22 to the first optical modulator 161 and the length of the second high-frequency wave transmission path 242 extending from the high-frequency wave input unit 22 to the second optical modulator 162. The first and second high-frequency wave transmission paths 241 and 242 of the optical modulation module 310 according to the fifth preferred embodiment can be shorter than the corresponding transmission paths of the optical modulation module according to the prerequisite technique (FIG. 12). This preferred embodiment can reduce the size of the optical modulation module 310 accordingly.

The optical modulation module 310 according to the fifth preferred embodiment further includes the first condenser lens 181 disposed upstream of the optical input terminal 2, the first collimator lens 171 disposed upstream of the first condenser lens 181, the second collimator lens 172 disposed downstream of the second optical coupler 9 included in the first optical modulator 161, the third collimator lens 173 disposed downstream of the second optical coupler 9 included in the second optical modulator 162, the rotator 21 that is disposed downstream of the third collimator lens 173 and rotates the polarization direction of the rays 90°, the beam splitter (the polarization beam splitter 20) that is disposed downstream of both the rotator 21 and the second collimator lens 172, and the second condenser lens 182 disposed downstream of the beam splitter. The first and second condenser lenses 181 and 182, the first to third collimator lenses 171 to 173, the rotator 21, and the beam splitter are disposed so as to be adjacent to the second side (the side 1b) opposite to the first side (the side 1a) of the optical modulator element 300.

In the optical modulation module 310 according to the fifth preferred embodiment, the high-frequency wave signal input unit 22 and the first and second high-frequency wave transmission paths 241 and 242 are disposed on the first side (the side 1a) of the optical modulator element 300, and the optical members are disposed so as to be adjacent to the second side (the side 1b) opposite to the first side of the optical modulator element 300. The first and second high-frequency wave transmission paths 241 and 242 do not interfere with the paths of propagating rays. This configuration eliminates the first and second high-frequency wave transmission paths 241 and 242 having to bypass the paths of propagating rays. The footprints of the first and second high-frequency wave-transmission paths 241 and 242 are thus reduced, and the size of the optical modulation module 310 is also reduced accordingly.

Sixth Preferred Embodiment

Figure 6:
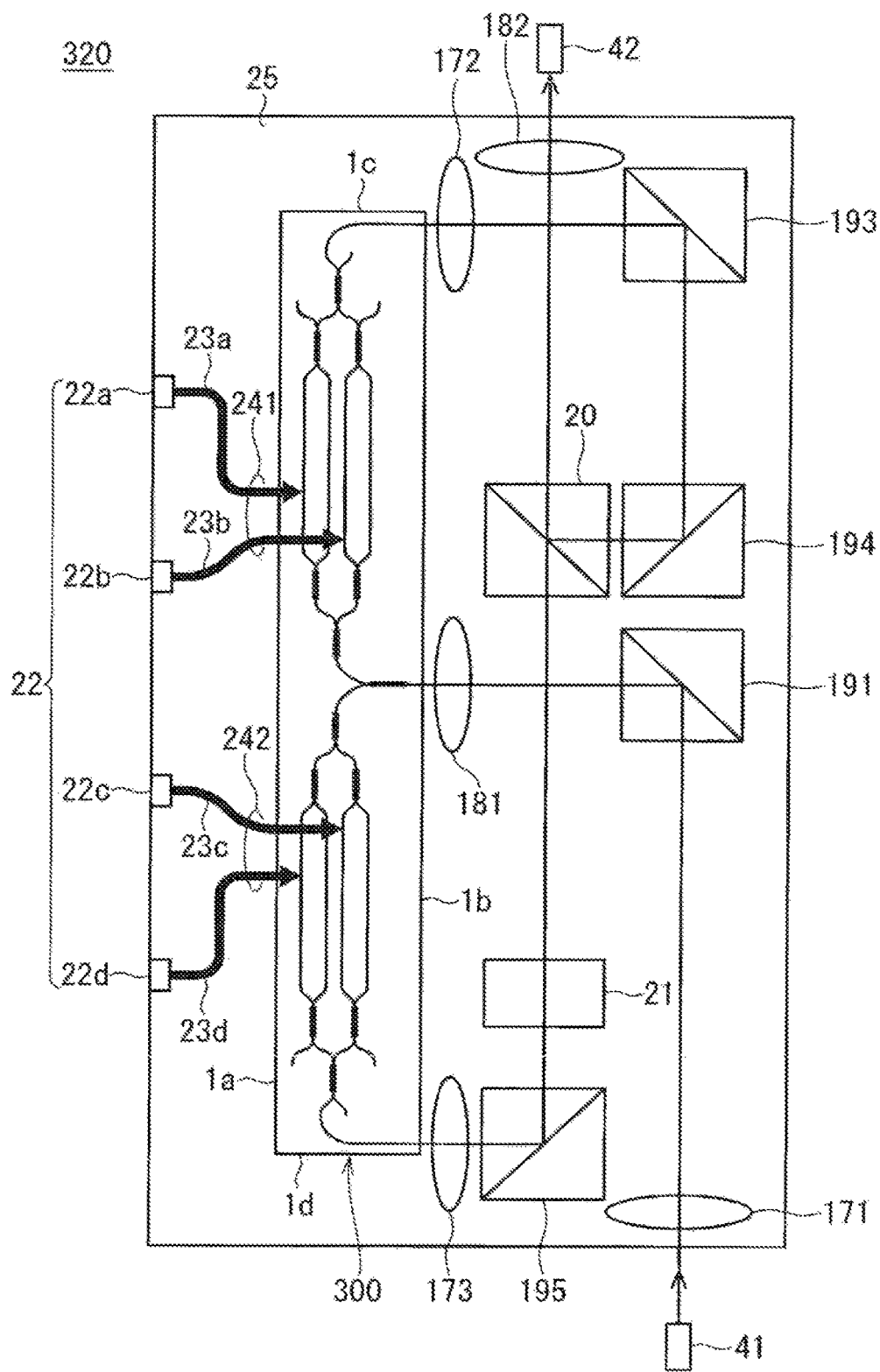
FIG. 6 is a plan view of the optical modulation module according to a sixth preferred embodiment.

FIG. 6 is a plan view of an optical modulation module 320 according to a sixth preferred embodiment. As illustrated in FIG. 6, the optical modulator element 300 described in the fourth preferred embodiment (FIG. 4) is disposed on the substrate 25 of the optical modulation module 320.

The input fiber 41 and the output fiber 42 have been disposed on the side of the optical modulation module 310 (FIG. 5) according to the fifth preferred embodiment opposite to the side on which the high-frequency wave input unit 22 is disposed. As for the optical modulation module 320 according to the sixth preferred embodiment, the input fiber 41 is disposed on the side adjacent to the side on which the high-frequency wave input unit 22 is disposed. The output fiber 42 is disposed on the side opposite to the side on which the input fiber 41 is disposed.

A light beam that has entered the optical modulation module 320 through the input fiber 41 is formed into parallel rays by the first collimator lens 171, and the rays propagate through the space. The rays are reflected by the mirror 191. Then, the first condenser lens 181 converges the rays to the optical input terminal 2 of the optical modulator element 300.

The rays output from the optical output terminal 31 of the optical modulator element 300 are formed into parallel rays by the second collimator lens 172, and the rays propagate through the space. The rays are reflected by the mirrors 193 and 194, and then, enter the PBS 20.

The rays output from the optical output terminal 32 of the optical modulator element 300 are formed into parallel rays by the third collimator lens 173, and the rays propagate through the space. The rays are reflected by the mirror 195. The polarization direction of the rays is rotated 90° by the rotator 21, and then, the rays enter the PBS 20. The output rays combined by the PBS 20 pass through the second condenser lens 182 to be converged to the output fiber 42.

In the sixth preferred embodiment, the first and second condenser lenses 181 and 182, the first to third collimator lenses 171 to 173, the rotator 21, and the PBS 20 are disposed so as to be adjacent to the second side (the side 1b) opposite to the first side (the side 1a) or the optical modulator element 300. The mirror 191, and the mirrors 193 to 195 are also disposed so as to be adjacent to the side 1b.

The optical modulation module 320 according to the sixth preferred embodiment is otherwise similar to the optical modulation module 310 (FIG. 5) and will not be further elaborated here.

The optical modulation module 320 according to the sixth preferred embodiment produces effects similar to effects described above in relation to the optical modulation module 310 according to the fifth preferred embodiment.

Seventh Preferred Embodiment

A method for manufacturing the optical modulator element 300 according to the fourth preferred embodiment will now be described in a seventh preferred embodiment. In the seventh preferred embodiment, the method for manufacturing the optical modulator element 300 includes the step of forming a pair of optical modulator elements 300 included in an optical modulator element 300P simultaneously on the semiconductor substrate 1 and the step of cutting the semiconductor substrate 1 to split the pair of optical modulator elements 300 formed on the semiconductor substrate 1.

Figure 7:
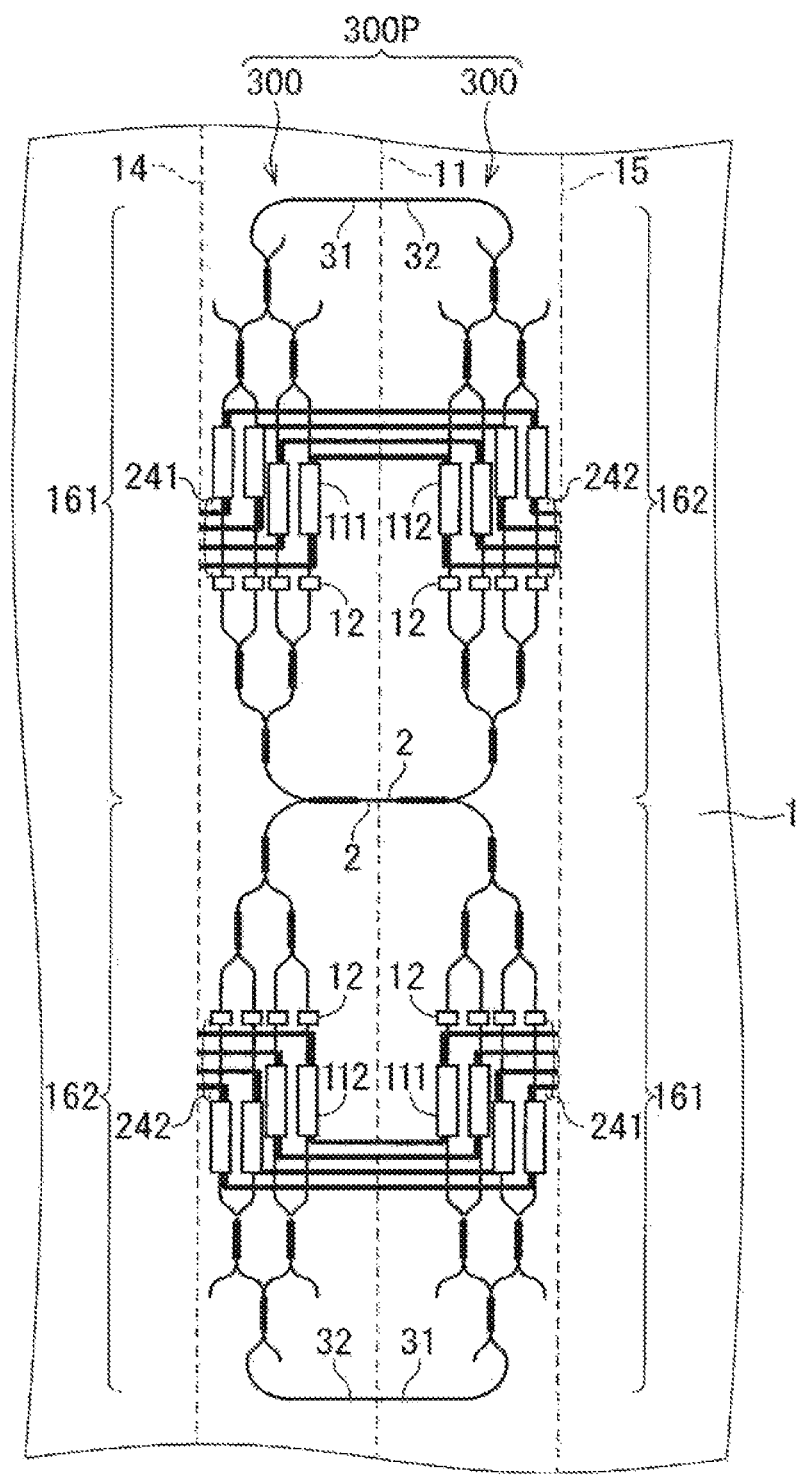
FIG. 7 is a plan view of optical modulator elements manufactured according to a method in a seventh preferred embodiment and disposed on a semiconductor substrate.

FIG. 7 is a plan view of the optical modulator elements 300 manufactured according to the method described in the seventh preferred embodiment and disposed on the semiconductor substrate 1. As illustrated in FIG. 7, the optical modulator element 300P includes a pair of optical modulator elements 300. The pair of optical modulator elements 300 is formed on the semiconductor substrate 1 so as to be rotationally symmetric at a rotation of 180 degrees with respect to the optical input terminal 2.

As illustrated in FIG. 7, the waveguides of the optical input terminals 2 of the pair of optical modulator elements 300 included in the optical modulator element 300P are connected with each other. The waveguide of the optical output terminal 31 of the first optical modulator 161 included in one optical modulator element 300 is connected with the waveguide of the optical output terminal 32 of the second modulator 162 included in the other optical modulator element 300. The waveguide of the optical output terminal 32 of the second optical modulator 162 included in the one optical modulator element 300 is connected with the optical output terminal 31 of the first modulator 161 included in the other optical modulator element 300.

The semiconductor substrate 1 is made of, for example, InP. On the semiconductor substrate 1, a clad layer made of an n-type semiconductor, a core layer including multiple quantum wells (MQW) used to trap light and perform modulation, and a clad layer made of a p-type semiconductor are epitaxially grown and laminated one by one.

Then, a waveguide having a high-mesa structure is formed on the semiconductor substrate 1. The entire waveguide pattern of the optical modulator element 300P illustrated in FIG. 7 is formed. The waveguide pattern is formed by dry etching, using a photomask. The waveguide pattern is formed in such a manner that a cutting line 11 of FIG. 7 extends along the crystal orientation of the semiconductor substrate 1.

Then, a passivation film is formed on the semiconductor substrate 1. The passivation film is made of SiO$_2$, SiN, or a high polymeric organic substance. Then, part of the passivation film which is to overlap the first and second high-frequency wave electrodes 111 and 112, the first and second high-frequency wave transmission paths 241 and 242, and the phase adjusters 12 in a plan view is etched to be removed.

The first and second high-frequency wave electrodes 111 and 112, the first and second high-frequency wave transmission paths 241 and 242, and the phase adjusters 12 are formed. Firstly, a photomask is printed on the semiconductor substrate 1, and then, the semiconductor substrate 3 is metalized. Together with the photomask, unnecessary metal is subsequently removed, so that the above-mentioned components are formed. The pair of optical modulator elements 300 is accordingly formed on the semiconductor substrate 1 as illustrated in FIG. 7.

Then, the semiconductor substrate 1 is cut along the cutting line 11 of FIG. 7, so that the optical modulator elements 300 formed on the semiconductor substrate 1 are separated from each other. The cutting line 11 is the straight line that passes through the connection between the optical input terminal 2 of one optical modulator element 300 of the pair of optical modulator elements 300 and the optical input terminal of the other optical modulator element 300 of the pair of optical modulator elements 300, the connection between the optical output terminal 31 of the first optical modulator 161 included in the one optical modulator element 300 and the optical output terminal 32 of the second optical modulator 162 included in the other optical modulator element 300, and the connection between the optical output terminal 32 of the second optical modulator 162 included in the one optical modulator element 300 and the optical output terminal 31 of the first optical modulator 161 of the other optical modulator element 300. That is, two optical modulator elements 300 included in the optical modulator element 300P are disposed so as to be mirror images of each other relative to the cutting line 11.

The optical input terminal 2 and the optical output terminals 31 and 32 are exposed from the cross section of the semiconductor substrate 1 cut out along the cutting line 11. The cross section corresponds to the surface adjoined by the side 1b illustrated in FIG. 4. An antireflection coating is applied to the cross section. Two optical modulator elements 300 are manufactured accordingly. Furthermore, the semiconductor substrate 1 may be cut along, for example, cutting lines 14 and 15 illustrated in FIG. 7, as needed.

Figure 8:
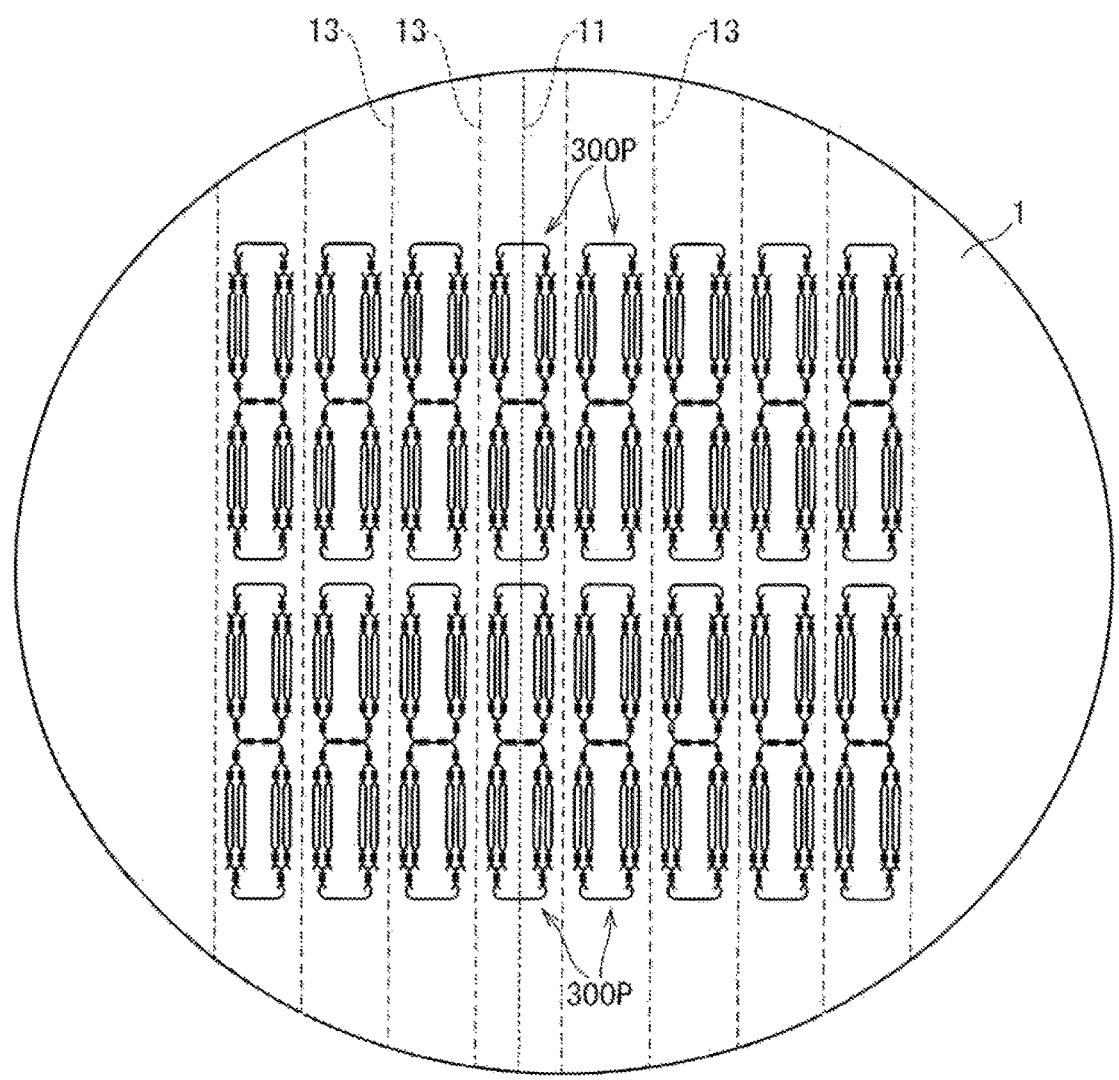
FIG. 8 is another plan view of optical modulator elements manufactured according to the method described in the seventh preferred embodiment and disposed on the semiconductor substrate.

FIG. 8 is another plan view of the optical modulator elements 300 manufactured according to the method described in the seventh preferred embodiment and disposed on the semiconductor substrate 1. For easy understanding of the illustration, the high-frequency wave electrodes, the high-frequency wave transmission paths, and the like are omitted from FIG. 8.

With reference to FIG. 8, sixteen optical modulator elements 300 are arranged in a matrix with two rows and eight columns on the semiconductor substrate 1, namely, a semiconductor wafer. In each column of the matrix, two optical modulator elements 300P are formed on the semiconductor substrate 1 in such a manner that the cutting lines 11 of the respective optical modulator elements 300P are arranged in a straight line. The entire waveguide pattern of the sixteen optical modulator elements 300P is formed by dray etching, using a photomask.

Figure 9:
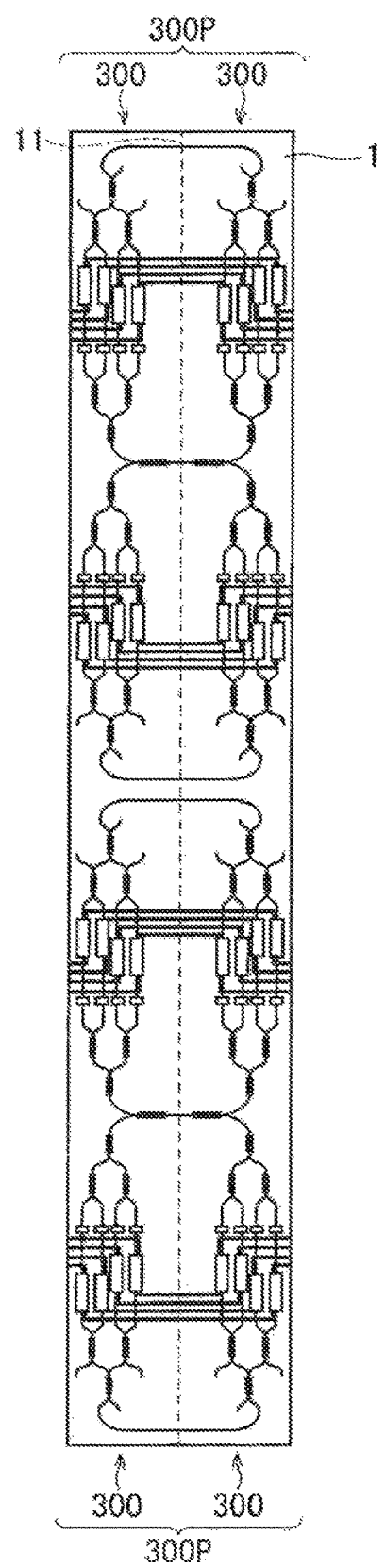
FIG. 9 is a plan view of the semiconductor substrate cut out along the cutting lines of FIG. 8.

The semiconductor substrate 1 is cut along cutting lines 13 of FIG. 8, so that the individual columns of the matrix are separated from one other. FIG. 9 is a plan view of the semiconductor substrate 1 cut out along the cutting lines 13 of FIG. 8. As illustrated in FIG. 9, two optical modulator elements 300P are formed on the semiconductor substrate 1 in such a manner that the cutting lines 11 of the respective optical modulator elements 300P are arranged in a straight line.

Then, the semiconductor substrate 1 is cut along the cutting line 11 of FIG. 9 to split the pair of optical modulator elements 300 included in each of the two optical modulator elements 300P formed in the same column of the matrix on the semiconductor substrate 1. FIG. 10 is a plan view of the semiconductor substrate 1 cut out along the cutting line 11 of FIG. 9. Then, an antireflection coating is applied to the cross section of the semiconductor substrate 1 cut out along the cutting line 11.

After the application of the antireflection coating to the cross section of the semiconductor substrate 1 cut out along the cutting line 11, the cut-out semiconductor substrate 1 is cut along a cutting line 16 of FIG. 10. The optical modulator elements 300 disposed on the semiconductor substrate 1 cut out along the cutting line 11 are separated from each other accordingly.

Thus, four optical modulator elements 300 are obtained from each column of the matrix formed on the semiconductor substrate 1, namely, the semiconductor wafer. With reference to FIG. 8, two optical modulator elements 300P have been disposed in each column. Alternatively, more than two optical modulator elements 300P may be disposed in each column as long as the cutting lines 11 passing through the respective optical modulator elements 300P in the same column are arranged in a straight line.

Effects

The method for manufacturing optical modulator element described in the seventh preferred embodiment is a method for manufacturing the optical modulator element 300 according to the fourth preferred embodiment and includes steps (a) and (b). The step (a) is for forming at least one pair of optical modulator elements 300 simultaneously on the semiconductor substrate 1. The step (b) is for cutting the semiconductor substrate 1 along the cutting line 11 to split the at least one pair of optical modulator elements 300 formed on the semiconductor substrate 1. In the step (a), the at least one pair of optical modulator elements 300 is formed on the semiconductor substrate 1 so as to be rotationally symmetric at a rotation of 180 degrees with respect to the optical input terminal 2. In the step (a), the optical input terminal 2 of one optical modulator element 300 of the at least one pair of optical modulator elements 300 is connected with the optical input terminal 2 of the other optical modulator element 300 of the at least one pair of optical modulator elements 300. Also, in the step (a), the optical output terminal 31 of the first optical modulator 161 included in the one optical modulator element 300 is connected with the optical output terminal 32 of the second modulator 162 included in the other optical modulator element 300, and the optical output terminal 32 of the second optical modulator 162 included in the one optical modulator element 300 is connected with the optical output terminal 31 of the first modulator 161 included in the other optical modulator element 300. In the step (b), the cutting line 11 is a straight line that passes through the connection between the optical input terminal 2 of the one optical modulator element 300 and the optical input terminal 2 of the other optical modulator element 300, the connection between the optical output terminal 31 of the first optical modulator 161 included in the one optical modulator element 300 and the optical output terminal 32 of the second optical modulator 162 included in the other optical modulator element 300, and the connection between the optical output terminal 32 of the second optical modulator 162 included in the one optical modulator element 300 and the optical output terminal 31 of the first optical modulator 161 included in the other optical modulator element 300.

When the semiconductor substrate 1 having the pair of optical modulator elements 300 formed and disposed thereon as mentioned above is cut alone the cutting line 11, the waveguide of the optical input terminal 2 and the waveguides of the optical output terminals 31 and 32 of the individual optical modulator element 300 are unfailingly exposed from the cross section because of the interconnection formed in the pair of optical modulator elements 300. Specifically, the optical input terminal 2 of one optical modulator element 300 of the pair of optical modulator elements 300 is connected with the optical input terminal 2 of the other optical modulator element 300 of the pair of optical modulator elements 300. In addition, the optical output terminal 31 of the first optical modulator 161 included in the one optical modulator element 300 is connected with the optical output terminal 32 of the second optical modulator 162 included in the other optical modulator element 300. Also, the optical output terminal 32 of the second modulator 162 included in the one optical modulator element 300 is connected with the optical output terminal 31 of the first modulator 161 included in the other optical modulator element 300. In some cases, the actual cutting line goes off the ideal cutting line 11 due to mechanical errors and the like while the semiconductor substrate 1 is cut, in such a case as well, the waveguides are unfailingly exposed from the cross section.

In a case where the plurality of optical modulator elements are disposed separately from each other on the semiconductor substrate, the end of each waveguide of the individual optical modulator element needs to be extended in order to avoid the waveguides remaining hidden behind the cross section of the semiconductor substrate. The seventh preferred embodiment can eliminate the need for extending the waveguides of the individual optical modulator element 300. This can reduce the area occupied by the individual optical modulator element 300 on the semiconductor substrate 1. Additional optical modulator elements 300 can be formed on one semiconductor substrate 1, namely, one semiconductor wafer, accordingly.

According to the method for manufacturing optical modulator element described in the seventh preferred embodiment, the at least one pair of optical modulator elements 300 may comprise a plurality of pairs of optical modulator elements 300. In the step (a), the plurality of pairs of optical modulator elements 300 are formed simultaneously on the semiconductor substrate 1 in such a manner that the cutting lines 11 passing through the plurality of pair of optical modulator elements 30 are arranged in a straight line.

The plurality of pairs of optical modulator elements 300 are disposed in such a manner that their respective cutting lines 11 are arranged in a straight line. Thus, each pair of optical modulator elements 300 can be split along one straight line. This can reduce the number of cutting processes, thereby improving the production efficiency.

The method for manufacturing optical modulator element described in the seventh preferred embodiment further includes steps (c) and (d). In the step (c) subsequent to the step (b), an antireflection coating is applied to a cross section of the semiconductor substrate 1 cut out along the cutting lines 11. In the step (d) subsequent to the step (c), the semiconductor substrate 1 cut out along the cutting lines 11 is cut to separate the plurality of optical modulator elements 300 disposed on the cut-out semiconductor substrate 1.

Before the plurality of optical modulator elements 300 are separated from each other, the antireflection coating is applied to the cross section of the semiconductor substrate 1 cut along the cutting line 11. The production efficiency is higher in this embodiment than in the case in which the plurality of optical modulator elements 300 are firstly separated from each other and the antireflection coating is subsequently applied to the individual optical modulator elements 300.

The optical input terminal 2, the optical output terminal 31, and the optical output terminal 32 are disposed on the same side, namely, the side 1b of the optical modulator element 300 (see FIG. 4) manufactured according to the method described in the seventh preferred embodiment. Thus, it is only required that an antireflection coating be applied to the side 1b alone. The number of sides (the number of surfaces) to which the antireflection coating is to be applied in this preferred embodiment can be reduced to one, whereas the antireflection coating needs to be applied to two sides (two surfaces) of the optical modulator element according to the prerequisite technique (FIG. 11) in which the optical input terminal 2 and the optical output terminals 31 and 32 are disposed on different sides. This preferred embodiment can reduce manufacturing costs accordingly.

The optical modulator element described in the first to seventh preferred embodiments performs optical modulation in the dual-polarization quadrature phase-shift keying. However, optical modulation is not limited to particular schemes.

The optical modulator may perform modulation in, for example, dual-polarization 16-quadrature amplitude modulation (DP-16QAM).

In the present invention, the above-preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. An optical modulator element comprising:
a first optical modulator and a second optical modulator that are disposed on a semiconductor substrate;
an optical input terminal to receive a light beam; and
a branch coupler to split the light beam received by said optical input terminal into said first and second optical modulators, wherein
each of said first and second optical modulators includes:
a pair of Mach-Zehnder waveguides;
a first optical coupler to split rays from said branch coupler into said pair of Mach-Zehnder waveguides; and
a second optical coupler to combine rays transmitted through said pair of Mach-Zehnder waveguides, and
said first and second optical modulators are disposed in such a manner that a traveling direction of rays propagating through said pair of Mach-Zehnder waveguides of said first optical modulator and a traveling direction of rays propagating through said pair of Mach-Zehnder waveguides of said second optical modulator are angled away from each other,
wherein the traveling direction of rays propagating through said pair of Mach-Zehnder waveguides of said first optical modulator forms an angle of 180° with the traveling direction of rays propagating through said pair of Mach-Zehnder waveguides of said second optical modulator,
the optical modulator element further comprising:
a first high-frequency wave electrode disposed along said pair of Mach-Zehnder waveguides of said first optical modulator;
a second high-frequency wave electrode disposed along said pair of Mach-Zehnder waveguides of said second optical modulator;
a first high-frequency wave transmission path connected to said first high-frequency wave transmission electrode; and
a second high-frequency wave transmission path connected to said second high-frequency wave transmission electrode, wherein
said first and second optical modulators are disposed so as to be mirror images of each other relative to said optical input terminal,
said first and second high-frequency wave electrodes are disposed so as to be mirror images of each other relative to said optical input terminal, and
said first and second high-frequency wave transmission paths are disposed so as to be mirror images of each other relative to said optical input terminal.

2. An optical modulation module comprising:
an optical modulator element according to claim 1;
a plurality of signal input terminals corresponding to said first high-frequency wave transmission path; and
a plurality of signal input terminals corresponding to said second high-frequency wave transmission path, wherein
said optical modulator element has sides that define an outline in a plan view, said sides including a first side and a second side,
said plurality of signal input terminals corresponding to said first high-frequency wave transmission path and said plurality of signal input terminals corresponding to said second high-frequency wave transmission path are disposed on said first side of said optical modulator element, and
said plurality of signal input terminals corresponding to said first high-frequency wave transmission path and said plurality of signal input terminals corresponding to said second high-frequency transmission path are disposed at regular intervals.

3. The optical modulation module according to claim 2, further comprising:
a first condenser lens disposed upstream of said optical input terminal;
a first collimator lens disposed upstream of said first condenser lens;
a second collimator lens disposed downstream of said second optical coupler included in said first optical modulator;
a third collimator lens disposed downstream of said second optical coupler included in said second optical modulator;
a rotator that is disposed downstream of said third collimator lens and rotates a polarization direction of rays 90°;
a beam splitter that is disposed downstream of both said rotator and said second collimator lens and combines rays; and
a second condenser lens disposed downstream of said beam splitter,
wherein said first and second condenser lenses, the first to third collimator lenses, said rotator, and said beam splitter are disposed so as to be adjacent to said second side opposite to said first side of said optical modulator element.

4. The optical modulator element according to claim 1, wherein the optical modulator element is configured to perform optical modulation in dual-polarization quadrature phase-shift keying.

5. An optical modulator element comprising:
a first optical modulator and a second optical modulator that are disposed on a semiconductor substrate;
an optical input terminal to receive a light beam; and
a branch coupler to split the light beam received by said optical input terminal into said first and second optical modulators, wherein
each of said first and second optical modulators includes:
a pair of Mach-Zehnder waveguides;
a first optical coupler to split rays from said branch coupler into said pair of Mach-Zehnder waveguides, and
a second optical coupler to combine rays transmitted through said pair of Mach-Zehnder waveguides, wherein
said first and second optical modulators are disposed in such a manner that a traveling direction of rays propagating through said pair of Mach-Zehnder waveguides of said first optical modulator and a traveling direction of rays propagating through said pair of Mach-Zehnder waveguides of said second optical modulator are angled away from each other the traveling direction of rays propagating through said pair of Mach-Zehnder waveguides of said first optical modulator forms an angle of 180° with the traveling direction of rays propagating through said pair of Mach-Zehnder waveguides of said second optical modulator, the optical modulator element includes sides that define an outline in a plan view, each of said first and second optical modulators of said optical modulator element further including an optical output terminal disposed downstream of said second optical coupler, and all of said optical input terminal, said optical output terminal of said first optical modulator, and said optical output terminal of said second optical modulator are disposed on one of said sides.

6. A method for manufacturing an optical modulator element according to claim 5, comprising:

(a) forming at least one pair of said optical modulator elements simultaneously on a semiconductor substrate; and (b) cutting said semiconductor substrate along a cutting line to split said at least one pair of optical modulator elements formed on said semiconductor substrate, wherein in said step (a), said at least one pair of optical modulator elements is formed on said semiconductor substrate so as to be rotationally symmetric at a rotation of 180 degrees with respect to said optical input terminal, said optical input terminal of one optical modulator element of said at least one pair of optical modulator elements is connected with said optical input terminal of the other optical modulator element of said at least one pair of optical modulator elements, said optical output terminal of said first optical modulator included in said one optical modulator element is connected with said optical output terminal of said second optical modulator included in said other optical modulator element, and said optical output terminal of said second optical modulator included in said one optical modulator element is connected with said optical output terminal of said first optical modulator included in said other optical modulator element, and in said step (b), said cutting line is a straight line that passes through a connection between said optical input terminal of said one optical modulator element and said optical input terminal of said other optical modulator element, a connection between said optical output terminal of said first optical modulator included in said one optical modulator element and said optical output terminal of said second optical modulator included in said other optical modulator element, and a connection between said optical output terminal of said second optical modulator included in said one optical modulator element and said optical output terminal of said first optical modulator included in said other optical modulator element.

7. The method for manufacturing optical modulator element according to claim 6, wherein said at least one pair of optical modulator elements comprises a plurality of pairs of optical modulator elements, and in said step (a), said plurality of pairs of optical modulator elements are formed simultaneously on said semiconductor substrate in such a manner that a plurality of said cutting lines passing through said plurality of pairs of optical modulator elements are arranged in a straight line.

8. The method for manufacturing optical modulator element according to claim 7, further comprising:

(c) applying, after said step (b), an antireflection coating to a cross section of said semiconductor substrate cut out along said plurality of cutting lines; and (d) further cutting, after said step (c), said semiconductor substrate cut out along said plurality of cutting lines to separate a plurality of said optical modulator elements disposed on said cut-out semiconductor substrate.

* * * * *